US009820219B2

(12) United States Patent
Tsuboi et al.

(10) Patent No.: US 9,820,219 B2
(45) Date of Patent: Nov. 14, 2017

(54) WIRELESS COMMUNICATION SYSTEM, TERMINAL APPARATUS, WIRELESS COMMUNICATION METHOD, AND INTEGRATED CIRCUIT

(71) Applicant: Sharp Kabushiki Kaisha, Osaka-shi, Osaka (JP)

(72) Inventors: Hidekazu Tsuboi, Osaka (JP); Katsunari Uemura, Osaka (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 15/021,969

(22) PCT Filed: Aug. 25, 2014

(86) PCT No.: PCT/JP2014/072122
§ 371 (c)(1),
(2) Date: Mar. 15, 2016

(87) PCT Pub. No.: WO2015/045701
PCT Pub. Date: Apr. 2, 2015

(65) Prior Publication Data
US 2016/0227480 A1    Aug. 4, 2016

(30) Foreign Application Priority Data

Sep. 26, 2013    (JP) ................................. 2013-199909

(51) Int. Cl.
*H04W 48/18*    (2009.01)
*H04B 17/318*   (2015.01)
(Continued)

(52) U.S. Cl.
CPC .......... *H04W 48/18* (2013.01); *H04B 17/318* (2015.01); *H04W 40/08* (2013.01);
(Continued)

(58) Field of Classification Search
CPC ............................. H04W 83/02; H04W 36/30
(Continued)

(56) References Cited

U.S. PATENT DOCUMENTS

2008/0220784 A1* 9/2008 Somasundaram ................... H04W 36/0083
                                                                                                455/437
2011/0222523 A1* 9/2011 Fu ........................ H04W 36/22
                                                                                                370/338
(Continued)

OTHER PUBLICATIONS

Official Communication issued in International Patent Application No. PCT/JP2014/072122, dated Nov. 11, 2014.
(Continued)

*Primary Examiner* — Cong Tran
(74) *Attorney, Agent, or Firm* — Keating & Bennett, LLP

(57) ABSTRACT

In a wireless communication system in which information for selecting a communication system is notified from a base station apparatus to a terminal apparatus, the base station apparatus broadcasts broadcast information containing all or part of the information as information for each group, and the terminal apparatus includes an RRC control unit that analyzes a message of an RRC layer and an interface selecting unit that selects a communication system for transmitting and receiving user data. The RRC control unit selects, from the information broadcasted from the base station apparatus as the message of the RRC layer, information on the group to which the terminal apparatus belongs, and the interface selecting unit selects, on the basis of threshold information contained in the information selected, a measured value to be compared with the threshold information, and a policy for communication system selection containing the comparison as a condition, a communication system through which all or part of the user data is transmitted and received.

4 Claims, 7 Drawing Sheets

(51) Int. Cl.
*H04W 40/08* (2009.01)
*H04W 48/10* (2009.01)
*H04W 48/16* (2009.01)
*H04W 84/04* (2009.01)
*H04W 84/12* (2009.01)

(52) U.S. Cl.
CPC ............ *H04W 48/10* (2013.01); *H04W 48/16* (2013.01); *H04W 84/042* (2013.01); *H04W 84/12* (2013.01)

(58) Field of Classification Search
USPC .................. 455/434, 435.1–2, 436–439; 370/331–332, 338
See application file for complete search history.

(56) References Cited

U.S. PATENT DOCUMENTS

2013/0336153 A1* 12/2013 Liang .................... H04W 24/10 370/252
2013/0344814 A1* 12/2013 Fujishiro ............... H04W 24/08 455/67.11
2014/0293858 A1* 10/2014 Kalhan ............. H04W 36/0072 370/311
2015/0085650 A1* 3/2015 Cui et al. .......... H04W 28/0289 370/230
2015/0327178 A1* 11/2015 Hennelly et al. .. H04W 52/0245 370/331

OTHER PUBLICATIONS

"3rd Generation Partnership Project; Technical Specification Group Radio Access Network; Study on WLAN/3GPP Radio Interworking (Release 12)," 3GPP TR 37.834 V0.3.0, May 2013, pp. 1-14.

Broadcom Corporation et al., "WLAN Interworking: OPI", 3GPP TSG-SA WG2 Meeting #103, S2-141684, May 13, 2014, pp. 1-6.

Alcatel-Lucent, et al.; "Analysis of Solution 1"; 3GPP TSG-RAN WG2#82; R2-132018; May 10, 2013; 4 pages.

LG Electronics, Inc., et al.; "Text Proposal on WLAN3GPP Radio Interworking Solution 2"; 3GPP TSG-RAN2 Meeting#82; May 24, 2013; 3 pages.

NSN, et al.; "(Compromising) WLAN IW Solution for UEs With and Without ANDSF"; 3GPP TSG-RAN WG2 Meeting #83; Aug. 9, 2013; 5 pages.

* cited by examiner

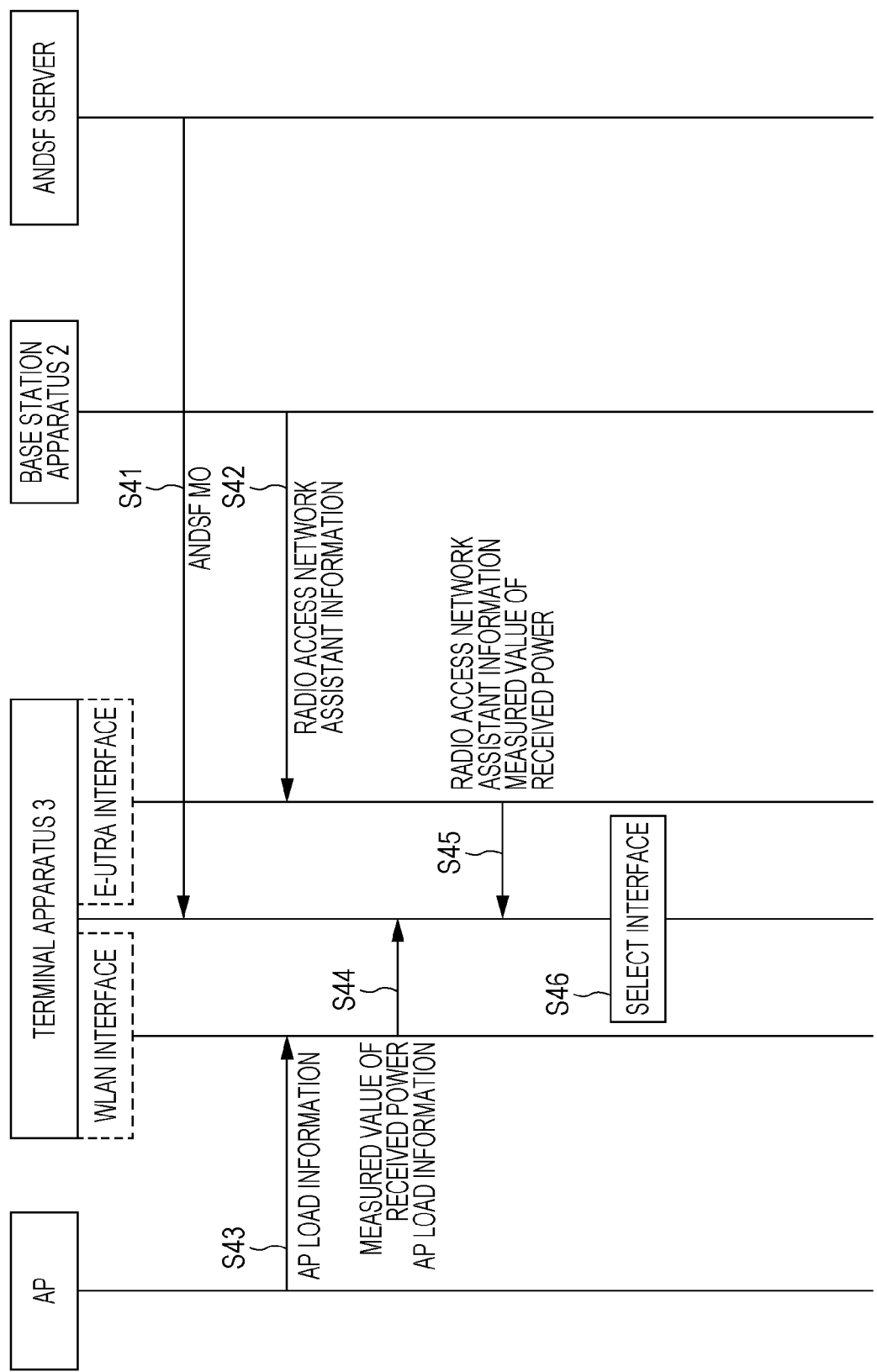

FIG. 5

| RAN ASSISTANT INFORMATION MESSAGE |
|---|

```
RAN-Assistant-Information ::= SEQUENCE {
    acSpecificInformation    SEQUENCE {
        ac0-9Information    RAN-Assistant-Information-Thresholds,    OPTIONAL,    -- Need OR
        ac11Information     RAN-Assistant-Information-Thresholds,    OPTIONAL,    -- Need OR
        ac12Information     RAN-Assistant-Information-Thresholds,    OPTIONAL,    -- Need OR
        ac13Information     RAN-Assistant-Information-Thresholds,    OPTIONAL,    -- Need OR
        ac14Information     RAN-Assistant-Information-Thresholds,    OPTIONAL,    -- Need OR
        ac15Information     RAN-Assistant-Information-Thresholds,    OPTIONAL,    -- Need OR
    }    OPTIONAL,    -- Need ON
    loadInformation    INTEGER (0..100)    -- Need ON
}

RAN-Assistant-Information-Thresholds ::= SEQUENCE {
    ran-threshold     INTEGER (0..100)    -- Need ON
    wlan-threshold    INTEGER (0..100)    -- Need ON
}
```

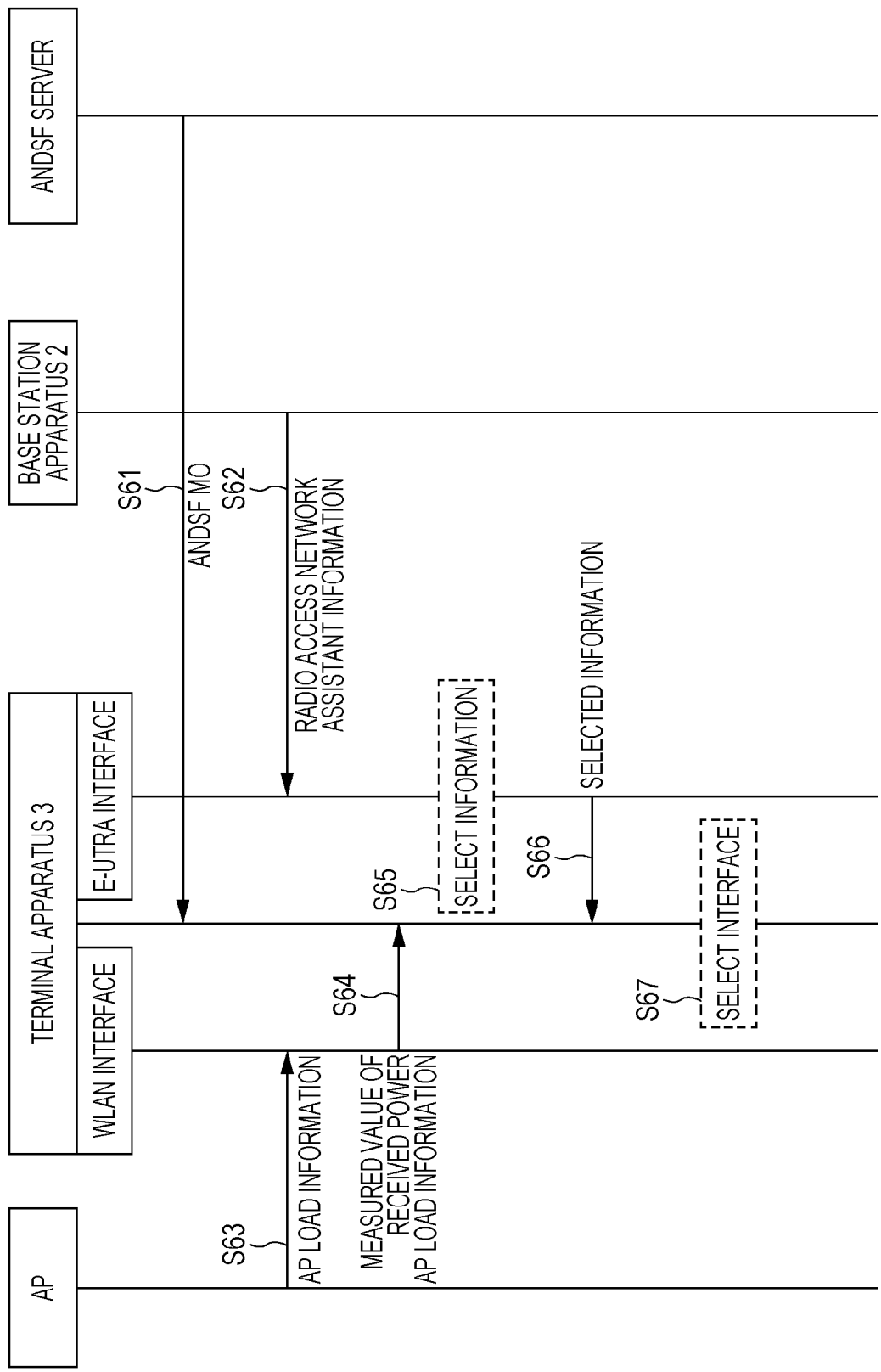

WIRELESS COMMUNICATION SYSTEM, TERMINAL APPARATUS, WIRELESS COMMUNICATION METHOD, AND INTEGRATED CIRCUIT

TECHNICAL FIELD

The present invention relates to a wireless communication system, a terminal apparatus, a wireless communication method, and an integrated circuit each of which uses radio access network assistant information according to the type of terminal apparatus.

The present application claims priority to Japanese Patent Application No. 2013-199909 filed in the Japanese Patent Office on Sep. 26, 2013, the disclosure of which is herein incorporated by reference in its entirety.

BACKGROUND ART

The 3GPP (Third Generation Partnership Project), which is a standardization project, has standardized Evolved Universal Terrestrial Radio Access (hereinafter referred to as "E-UTRA"), which achieves high-speed communications, by the adoption of the OFDM (orthogonal frequency-division multiplexing) communication scheme and flexible scheduling in predetermined units of frequency and time called resource blocks.

Further, the 3GPP is also working on the standardization of an evolutionary extension of E-UTRA, i.e., Advanced E-UTRA. Advanced E-UTRA envisages using a band up to a maximum bandwidth of 100 MHz for the uplink and the downlink alike to perform communications at maximum transmission rates of 1 Gbps or higher in the downlink and 500 Mbps or higher in the uplink.

Furthermore, Advanced E-UTRA is also discussing measures against sharp increases in traffic due to accesses to the Internet by smartphones and the like. That is, Advanced E-UTRA is discussing an arrangement (offloading arrangement) in which in a case where E-UTRA alone cannot cope with traffic, the concentration of traffic into E-UTRA is avoided by switching traffic from E-UTRA to another access system such as a wireless LAN (WLAN) or WiMAX depending on the situation.

NPL 1 discloses a method in which a terminal apparatus uses ANDSF (access network discovery and selection function) in the procedure for switching from one access system to another. ANDSF is a function for distributing a policy configured by a mobile operator to a terminal apparatus so that the terminal apparatus can select an access system for one or more flows in which the terminal apparatus is communicating or is to perform communication (or for each access point name (APN)).

NPL 1 discloses that radio access network assistant information notified from a base station apparatus to a terminal apparatus and measurement information in the terminal apparatus are used in selecting an access system on the basis of a policy distributed by ANDSF.

CITATION LIST

Non-Patent Document

[Non-Patent Document 1] NPL 1: 3GPP TR (Technical Report) 37.834, V0.3.0, Study on WLAN/3GPP Radio Interworking

DISCLOSURE OF THE INVENTION

Problems to be Solved by the Invention

NPL 1 discloses that load information, resource allocation information, a threshold for making an evaluation based on received power, and the like are broadcasted as radio access network assistant information from a base station apparatus to a terminal apparatus, and that by using the radio access network assistant information, a measured value of received power or the like for each access system (such as E-UTRA, WLAN, or WiMAX) measured in the terminal apparatus, and the like, switching of access systems is done on the basis of a policy that is distributed by ANDSF.

Means for Solving the Problems

However, while NPL 1 proposes using the aforementioned parameters as radio access network assistant information to be broadcasted to a terminal apparatus, NPL 1 fails to specifically discuss control or the like according to the type of terminal apparatus, thus failing to enable efficient offloading based on the type of terminal apparatus.

It is therefore an object of embodiments of the present invention to solve the aforementioned problems by providing a wireless communication system a terminal apparatus, a wireless communication method, and an integrated circuit each of which uses radio access network assistant information according to the type of terminal apparatus.

Solution to Problem

In order to attain the object, the embodiments of the present invention have taken the following measures:

A first aspect of the present invention is directed to a wireless communication system in which information for selecting a communication system is notified from a base station apparatus to a terminal apparatus, the base station apparatus broadcasting broadcast information containing all or part of the information as information for each group, the terminal apparatus including: an RRC control unit that analyzes a message of an RRC layer; and an interface selecting unit that selects a communication system for transmitting and receiving user data, wherein the RRC control unit selects, from the information broadcasted from the base station apparatus as the message of the RRC layer, information on the group to which the terminal apparatus belongs, and the interface selecting unit selects, on the basis of threshold information contained in the information selected, a measured value to be compared with the threshold information, and a policy for communication system selection containing the comparison as a condition, a communication system through which all or part of the user data is transmitted and received.

A second aspect of the present invention is directed to a terminal apparatus for receiving, from a base station apparatus, information for selecting a communication system, the terminal apparatus including: an RRC control unit that analyzes a message of an RRC layer; and an interface selecting unit that selects a communication system for transmitting and receiving user data, wherein the RRC control unit selects, from the information broadcasted from the base station apparatus as the message of the RRC layer, information on the group to which the terminal apparatus belongs, and the interface selecting unit selects, on the basis of threshold information contained in the information selected, a measured value to be compared with the threshold information, and a policy for communication system selection containing the comparison as a condition, a communication system through which all or part of the user data is transmitted and received.

A third aspect of the present invention is directed to a wireless communication method that is applied to a terminal apparatus for receiving, from a base station apparatus, information for selecting a communication system, the method including at least the steps of: selecting, from the information broadcasted from the base station apparatus as the message of the RRC layer, information on the group to which the terminal apparatus belongs; and selecting, on the basis of threshold information contained in the information selected, a measured value to be compared with the threshold information, and a policy for communication system selection containing the comparison as a condition, a communication system through which all or part of the user data is transmitted and received.

A fourth aspect of the present invention is directed to an integrated circuit that is mounted in a terminal apparatus for receiving, from a base station apparatus, information for selecting a communication system, the integrated circuit causing the terminal apparatus to fulfill at least the functions of: selecting, from the information broadcasted from the base station apparatus as the message of the RRC layer, information on the group to which the terminal apparatus belongs; and selecting, on the basis of threshold information contained in the information selected, a measured value to be compared with the threshold information, and a policy for communication system selection containing the comparison as a condition, a communication system through which all or part of the user data is transmitted and received.

The embodiments are disclosed herein in terms of a technology related to a wireless communication system a terminal apparatus, a wireless communication method, and an integrated circuit each of which uses radio access network assistant information according to the type of terminal apparatus. A communication scheme applicable to the embodiments is not limited solely to an E-UTRA compatible communication scheme such as E-UTRA or Advanced E-UTRA.

For example, the technology described herein can be used in various communication systems using code division multiple access (CDMA), time division multiple access (TDMA), frequency division multiple access (FDMA), orthogonal FDMA (OFDMA), single-carrier FDMA (SC-FDMA), and other access schemes. Further, the terms "system" and "network" as used herein are synonymous with each other.

Effects of the Invention

As described above, an embodiment of the present invention can provide a wireless communication system a terminal apparatus, a wireless communication method, and an integrated circuit each of which uses radio access network assistant information according to the type of terminal apparatus.

BRIEF DESCRIPTION OF THE DRAWINGS

FIG. 4 is an example of a sequence chart of a method in which a terminal apparatus according a first embodiment of the present invention acquires a policy and radio access network assistant information.

FIG. 5 is a diagram showing an example of radio access network assistant information according to an embodiment of the present invention.

FIG. 6 is an example of a sequence chart of a method in which a terminal apparatus according a second embodiment of the present invention acquires a policy and radio access network assistant information.

MODE FOR CARRYING OUT THE INVENTION

Figure 1:
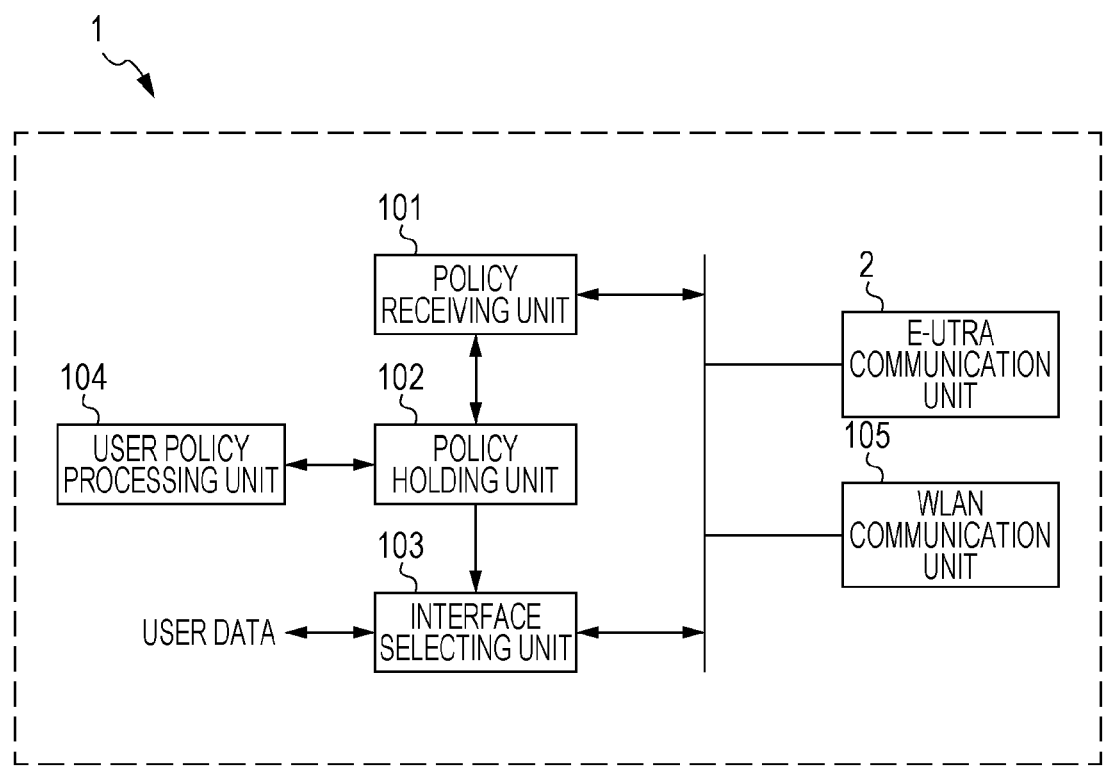
FIG. 1 is a block diagram schematically showing an example of a configuration of an E-UTRA communication unit of a terminal apparatus according to an embodiment of the present invention.

The following briefly describes technologies related to embodiments of the present invention.

[Physical Channels/Physical Signals]

Main physical channels and physical signals that are used in E-UTRA and Advanced E-UTRA are described. The term "channel" means a medium that is used in the transmission and reception of signals, and the term "physical channel" means a physical medium that is used in the transmission and reception of signals. The term "physical channel" as used herein is synonymous with the term "signal". E-UTRA and Advanced E-UTRA may have additional physical channels or changes or additions to the structures and formats of physical channels in future. However, such changes or additions, if any, do not affect the description of the embodiments of the present invention.

E-UTRA and Advanced E-UTRA use wireless frames to manage scheduling of physical channels or physical signals. The duration of one wireless frame is 10 ms, and one wireless frame is constituted by ten subframes. Furthermore, one subframe is constituted by two slots (that is, the duration of one subframe is 1 ms, and the duration of one slot is 0.5 ms). Further, the management is implemented by using resource blocks as minimum units of scheduling on which physical channels are allocated. Resource block is defined by a certain frequency domain whose frequency axis is constituted by a group of subcarriers (e.g., twelve subcarriers) and a domain constituted by a certain transmission time interval (one slot).

Synchronization signals are constituted by three types of primary synchronization signals and secondary synchronization signals constituted by 31 types of code that are interleaved in a frequency domain, and combinations of the primary synchronization signals and the secondary synchronization signals indicate 504 cell identifiers (physical cell IDs (PCI: physical cell identities) that identify a base station apparatus and frame timings for wireless synchronization. A terminal apparatus specifies the physical cell ID of a synchronization signal received by a cell search.

A physical broadcast channel (PBCH) is transmitted for the purpose of notifying (configuring) control parameters (broadcast information (system information (SI)) that are shared by terminal apparatuses within a cell. As for broadcast information that is not notified through the physical broadcast channel, the terminal apparatuses within the cell are notified of a radio resource to which the broadcast information is transmitted through a physical downlink control channel, and in the radio resource thus notified, a layer 3 message (system information) that notifies the broadcast information through a physical downlink shared channel is transmitted.

As broadcast information, a cell global identifier (CGI) that indicates an identifier of an individual cell, a tracking area identifier (TAI) that manages an idle area by paging, random access configuration information, transmission timing adjustment information, shared radio resource configuration information in the cell, neighboring cell information, uplink access restriction information, and the like are notified.

Downlink reference signals are classified into a plurality of types depending on their applications. For example, cell-specific RSs (CRSs: cell-specific reference signals) are pilot signals that are transmitted with predetermined power for each separate cell, and are downlink reference signals that are periodically repeated in a frequency domain and a time domain on the basis of a predetermined rule. The terminal apparatus measures the reception quality of each separate cell by receiving these cell-specific RSs. Further, the terminal apparatus also uses the downlink cell-specific RSs as referential signals for demodulation of physical downlink control channels or physical downlink shared channels that are transmitted simultaneously with the cell-specific RSs. Sequences that can be identified for each separate cell are used for the cell-specific RSs.

Further, downlink reference signals can also be used in the estimation of downlink channel fluctuation. Downlink reference signals that are used in the estimation of downlink channel fluctuation are referred to as "channel state information reference signals (CSI-RSs)". Further, downlink reference signals that are configured for each separate terminal apparatus are referred to as "UE specific reference signals (URSs)" or "dedicated RSs (DRSs)", and are referred to for a channel compensation process of a channel when a physical downlink control channel or a physical downlink shared channel is demodulated.

A physical downlink control channel (PDCCH) is transmitted using the first few OFDM symbols (e.g., one to four OFDM symbols) of each subframe. An enhanced physical downlink control channel (EPDCCH) is a physical downlink control channel that is allocated on an OFDM symbol on which a physical downlink shared channel PDSCH is allocated. The PDCCH or the EPDCCH is used for the purpose of notifying the terminal apparatus of radio resource allocation information according to scheduling of the base station apparatus or information indicating an amount of adjustment of an increase or decrease in transmit power. Unless otherwise noted, the term "physical downlink control channel (PDCCH)" as simply used hereinafter means both physical channels PDCCH and EPDCCH.

The terminal apparatus needs to monitor a physical downlink control channel addressed thereto before transmitting or receiving a layer 3 message (such as paging, a handover command), which is downlink data or downlink control data, receive the physical downlink control channel addressed thereto, and thereby acquire, from the physical downlink control channel, radio resource allocation information called an uplink grant at the time of transmission or a downlink grant (downlink assignment) at the time of reception. It should be noted that instead of being transmitted using the aforementioned OFDM symbols, the physical downlink control channel may be transmitted using a region of a resource block that is dedicatedly allocated from the base station apparatus to the terminal apparatus.

A physical uplink control channel (PUCCH) is used for making a reception acknowledgment response (ACK/NACK: acknowledgement/negative acknowledgement) to data transmitted through a physical downlink shared channel, downlink channel (channel state) information (CSI), or an uplink radio resource allocation request (radio resource request, scheduling request (SR)).

CSI contains a CQI (channel quality indicator), a PMI (precoding matrix indicator), a PTI (precoding type indicator), and a RI (rank indicator). Each of the indicators may be denoted as indication.

A physical downlink shared channel (PDSCH) is used for notifying the terminal apparatus of, as a layer 3 message, paging and broadcast information (system information) that is not notified through a physical broadcast channel, as well as downlink data. Radio resource allocation information on the physical downlink shared channel is indicated by a physical downlink control channel. The physical downlink shared channel is transmitted by being allocated on an OFDM symbol other than an OFDM symbol through which the physical downlink control channel is transmitted. That is, the physical downlink shared channel and the physical control channel are time-division multiplexed within one subframe.

A physical uplink shared channel (PUSCH) mainly transmits uplink data and uplink control data, and may contain control data such as downlink reception quality and ACK/NACK. Further, the physical uplink shared channel is also used for notifying uplink control information, as well as the uplink data, as a layer 3 message from the terminal apparatus to the base station apparatus. Further, as with the downlink, radio resource allocation information on the physical uplink shared channel is indicated by a physical downlink control channel.

An uplink reference signal (also referred to as "uplink pilot signal" or "uplink pilot channel") contains a demodulation reference signal (DMRS) that the base station apparatus uses to demodulate a physical uplink control channel PUCCH and/or a physical uplink shared channel PUSCH and a sounding reference signal (SRS) that the base station apparatus uses to estimate an uplink channel state. Further, the sounding reference signal is either a periodic sounding signal (periodic SRS) that is periodically transmitted or an aperiodic sounding signal (aperiodic SRS) that is transmitted when instructed by the base station apparatus.

A physical random access channel (PRACH) is a channel that is used for notifying (configuring) a preamble sequence, and has guard time. The preamble sequence is configured to notify the base station apparatus of information by a plurality of sequences. For example, in a case where 64 types of sequence are prepared, 6 bits of information can be presented to the base station apparatus. The physical random access channel is used as means of access by the terminal apparatus to the base station apparatus.

The terminal apparatus uses a physical random access channel to make an uplink radio resource request when a physical uplink control channel has not been configured yet or to request the base station apparatus for transmission timing adjustment information (also called timing advance (TA)) that is needed to synchronize an uplink transmission timing with a reception timing window of the base station apparatus. Further, the base station apparatus can also use a physical downlink control channel to request the terminal apparatus to start a random access procedure.

A detailed description of other physical channels or physical signals is omitted, as they are not involved in the embodiments of the present invention. Examples of physical channels or physical signals whose description has been omitted include a physical control format indicator channel (PCFICH), a physical HARQ indicator channel (PHICH: physical hybrid ARQ indicator channel), a physical multicast channel (PMCH), and the like.

[Wireless Network]

Communicable ranges (communication areas) of frequencies that are controlled by a base station apparatus is regarded as a cell. The communication areas covered by the base station apparatus may vary in size and shape according to the frequencies. Further, the covered areas may vary from frequency to frequency.

A terminal apparatus operates with the inside of a cell regarded as a communication area. In moving out of a cell into another, the terminal apparatus moves into another appropriate cell through a cell reselection procedure in an RRC_IDLE state or through a handover procedure in an RRC_CONNECTED state. The term "appropriate cell" refers to a cell which terminal apparatuses in general are not prohibited from accessing on the basis of information designated by the base station apparatus and whose downlink reception quality satisfies predetermined conditions.

When the terminal apparatus is communicable with a base station apparatus, that one of the cells of the base station apparatus which is configured to be used for communication with the terminal apparatus is referred to as "serving cell", and the other cells, which are not used for communication, are referred to as "neighboring cells".

[Wireless Protocol Structure]

Figure 7:
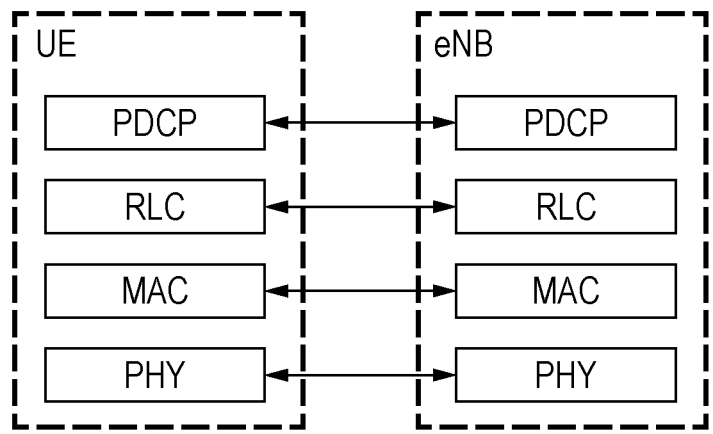
FIG. 7 is a diagram showing a UP (User-plane, U-Plane) protocol stack according to an embodiment of the present invention.
Figure 8:
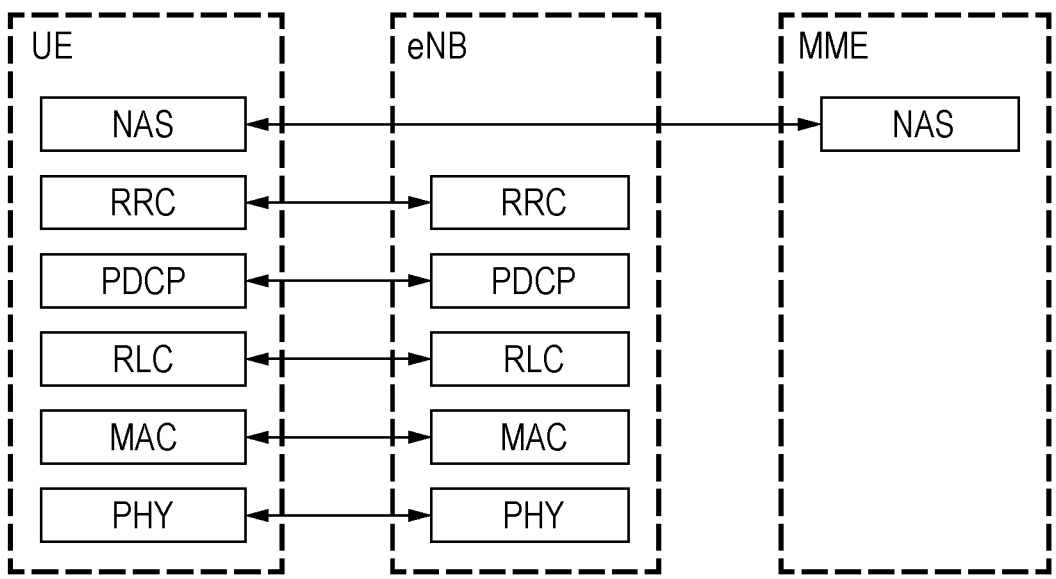
FIG. 8 is a diagram showing a CP (Control-plane, C-Plane) protocol stack according to an embodiment of the present invention.

FIG. 7 is a diagram showing a UP (User-plane, U-Plane) protocol stack handling user data of terminal apparatuses and base station apparatuses in an E-UTRA wireless network (EUTRAN). FIG. 8 is a diagram showing a CP (Control-plane, C-Plane) protocol stack handling control data.

In FIGS. 7 and 8, the physical layer (PHY layer) provides transmission services to the higher layer by utilizing physical channels. The PHY layer is connected through transport channels to the higher medium access control layer (MAC layer). The transport of data between the MAC layer, the PHY layer, and a layer occurs through the transport channels. The transmission and reception of data between the PHY layer of the terminal apparatus and that of the base station apparatus occur through the physical channels.

The MAC layer maps various logical channels onto various transport channels. The MAC layer is connected through the logical channels to the higher radio link control layer (RLC layer). The logical channels are categorized broadly in terms of the type of information they transmit. Specifically, the logical channels are categorized into control channels that transmit control information and traffic channels that transmit user information. The MAC layer has a function of performing control of the PHY layer to perform discontinuous reception and transmission (DRX, DTX), a function of executing a random access procedure, a function of notifying information representing transmit power, a function of performing HARQ control, and the like.

The RLC layer receives data from the higher layer and subjects the data to segmentation and concatenation to adjust data size so that the lower layer can appropriately transmit the data. Further, the RLC layer also has a function for guaranteeing the QoS (quality of service) that each data requires. That is, the RLC layer has a function of data retransmission control and the like.

The packet data convergence protocol layer (PDCP layer) has a header compression function of compressing unnecessary control information for efficient transmission of IP packets, which are user data, in a wireless section. Further, the PDCP layer also has a function of data ciphering.

Furthermore, the CP protocol stack includes a radio resource control layer (RRC layer). The RRC layer performs configuring and reconfiguring of radio bearers (RBs) and performs control of the logical channels, the transport channels, and the physical channels. The RBs are categorized into signaling radio bearers (SRBs) and data radio bearers (DRBs). The SRBs are utilized as paths through which RRC messages, which are control information, are transmitted. The DRBs are utilized as paths through which user information is transmitted. The configuration of each RB occurs between the RRC layer of the base station apparatus and that of the mobile station apparatus.

It should be noted that the PHY layer corresponds to a physical layer serving as a first layer in a hierarchical structure of a commonly known open systems interconnection (OSI) model, that the MAC layer, the RLC layer, and the PDCP layer correspond to a data link layer serving as a second layer of the OSI model, and that the RRC layer corresponds to a network layer serving as a third layer of the OSI model.

Further, a signaling protocol that is used between the network and the terminal apparatus are divided into an access stratum (AS) protocol and a non-access stratum (NAS) protocol. For example, the protocols at and lower the RRC layer is access stratum protocols that are used between the terminal apparatus and the base station apparatus. Further, protocols such as connection management (CM) and mobility management (MM) of the terminal apparatus are non-access stratum protocols that are used between the terminal apparatus and the core network (CN). For example, as shown in FIG. 8, the terminal apparatus and the mobile management entity (MME) use the non-access stratum protocols to transparently perform communication through the base station apparatus.

[ANDSF]

ANDSF (access network discovery and selection function) is a function for distributing a policy configured by a mobile operator to a terminal apparatus so that the terminal apparatus can select a system for use in communication for one or more flows in which the terminal apparatus is communicating or is to perform communication. Communication between an ANDSF server and a terminal apparatus uses an MO (management object) compatible with the Open Mobile Alliance Device Management (OMA-DM) standard. The ANDSF MO is hierarchized information including a policy (inter-system mobility policy: ISMP) relevant to mobility between systems, information (discovery information) for detecting other systems, location information (UE_Location) on the terminal apparatus, a policy (inter-system routing policy: ISRP) relevant to routing between systems, profile information (UE_Profile) relevant to the OS and capability of the terminal apparatus, and the like.

The ISMP and the ISRP contain, as a rule, a combination of the system to be prioritized, the place to be prioritized, the time to be prioritized, and the like. In a case where a plurality of these rules are configured, the system can be selected on the basis of the priority (rule priority) configured for each rule.

Further, as noted previously, NPL 1 is discussing the use of radio access network assistant information (RAN assistant information), a measured value of received power or the like for each access system (such as E-UTRA, WLAN, or WiMAX) measured in the terminal apparatus, and the like. For example, in a case where load information on the base station apparatus or a threshold for system change is notified as RAN assistant information, it is conceivable to extend the rule to select a WLAN in a case where the load on the base station apparatus exceeds a preset value or in a case where the measured value of the received power falls short of the threshold.

[Access Classes]

In a mobile communication system defined by the 3GPP, each terminal apparatus retains any one of access classes (ACs) of 0 to 9.

Further, special terminal apparatuses for network operators, police, government officials, and the like may retain ACs 11 to 15. It should be noted that AC 10, which is an AC for use in an emergency call, is not retained by any terminal apparatus but is used for dialing 110, 119, or the like (in the case of Japan).

In E-UTRA, each terminal apparatus is configured to determine whether it is able to make a call, and this determination is made according to the type of call such as a call responding to an incoming call, an emergency call, an outgoing call, and a signaling call and according to the AC to which the terminal apparatus belongs and regulatory information contained in broadcast information.

In view of these circumstances, the following gives a detailed description of preferred embodiments of the present invention with reference to the accompanying drawings. It should be noted that in a case where a specific description of a publicly-known function or configuration associated with the embodiments of the present invention is judged to obscure the gist of the embodiments of the present invention, the description of the embodiments of the present invention omits such a detailed description.

First Embodiment

The following describes a first embodiment of the present invention.

FIG. 1 is a diagram showing an example of a configuration of a terminal apparatus according to an embodiment of the present invention. As shown in FIG. 1, a terminal apparatus 1 includes a policy receiving unit 101, a policy holding unit 102, an interface selecting unit 103, a user policy processing unit 104, a WLAN communication unit 105, and an E-UTRA communication unit 2.

The policy receiving unit 101 is connected to a network through the E-UTRA communication unit 2 or the WLAN communication unit 105. The policy receiving unit 101 receives, from an ANDSF server or the like, a policy (policy information) for selecting an interface (communication system) for use in the transmission and reception of user data. The policy receiving unit 101 outputs the received policy to the policy holding unit 102.

The user policy processing unit 104 outputs a user policy to the policy holding unit 102. The user policy is information concerning interface selection configured by a user.

The policy holding unit 102 holds the policy configured by a mobile operator and inputted from the policy receiving unit 101 and the policy configured by the user and inputted from the user policy setting section 104.

The interface selecting unit 103 selects an interface through which user data is transmitted and received. This selection is based on a policy of the policy holding unit 102 and information (load information or RAN assistant information) inputted from the E-UTRA communication unit 2 or the WLAN communication unit 105 for selecting a communication system.

It is desirable here that the information inputted from the E-UTRA communication unit 2 or the WLAN communication unit 105 for selecting a communication system be information that is dynamically notified from each communication system, such as the aforementioned load information or RAN assistant information, and be a value that is evaluated (compared with a threshold) in the policy. Without being limited to this, the information may contain an evaluation formula or rule that constitutes a part of the policy. In this case, a policy (second policy) that complements a policy (first policy) that is received from the ANDSF server or the like may be inputted from the E-UTRA communication unit 2 to the interface selecting unit 103.

Figure 2:
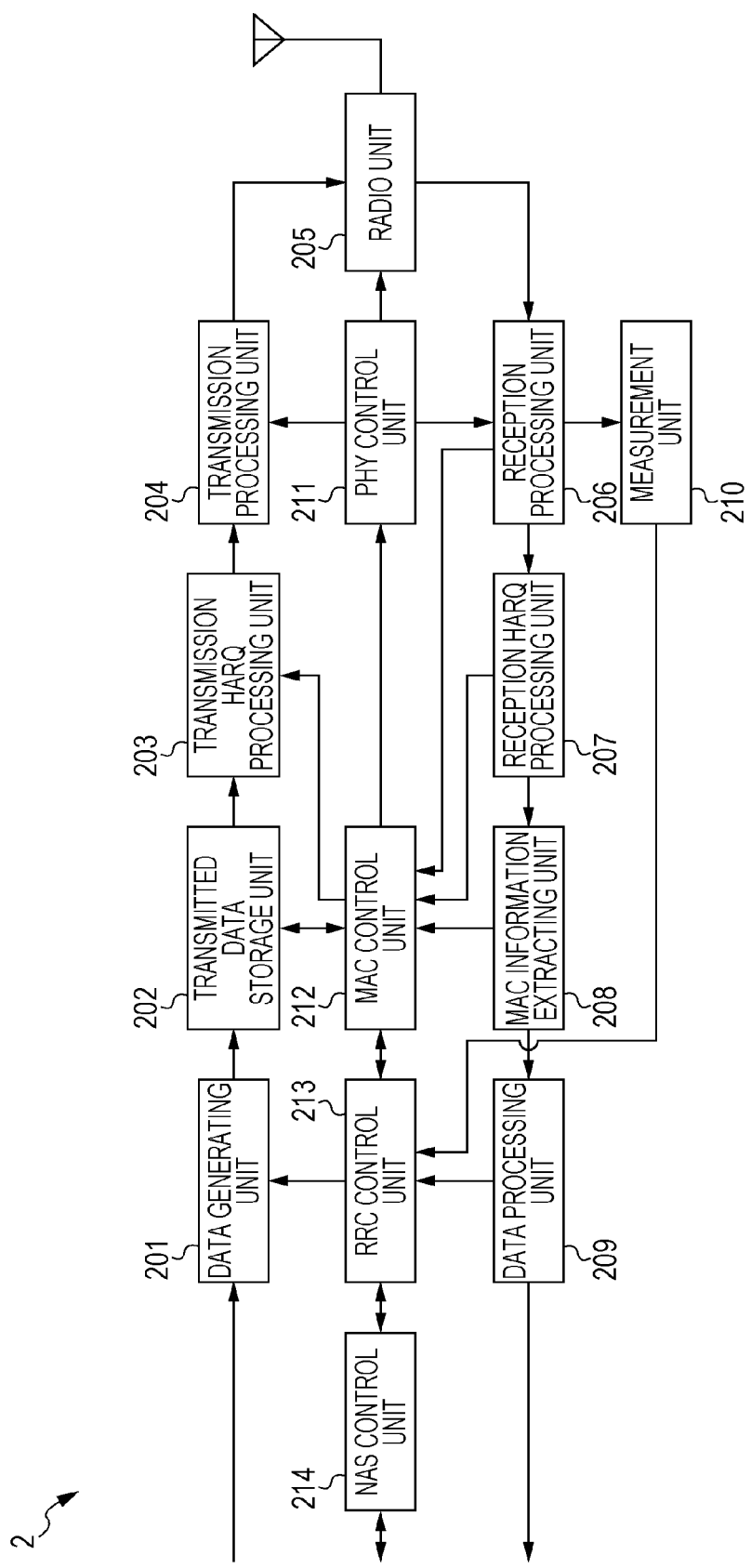
FIG. 2 is a block diagram schematically showing an example of a configuration of a base station apparatus according to an embodiment of the present invention.

FIG. 2 is a diagram showing an example of a configuration of the E-UTRA communication unit of the terminal apparatus 1 according to the embodiment of the present invention. As shown in FIG. 2, the E-UTRA communication unit 2 of the terminal apparatus includes a data generating unit 201, a transmitted data storage unit 202, a transmission HARQ processing unit 203, a transmission processing unit 204, a radio unit 205, a reception processing unit 206, a reception HARQ processing unit 207, an MAC information extracting unit 208, a data processing unit 209, a measurement unit 210, a PHY control unit 211, an MAC control unit 212, an RRC control unit 213, and an NAS control unit 214.

The data generating unit 201 receives user data from the higher layer and control data from the RRC control unit 213. The data generating unit 201 has the functions of the PDCP layer and the RLC layer. The data generating unit 201 adjusts data size by performing processes such as header compression of the IP packets of the user data, ciphering of the data, and segmentation and concatenation of the data. The data generating unit 201 outputs the processed data to the transmitted data storage unit 202.

The transmitted data storage unit 202 accumulates the data inputted from the data generating unit 201 and outputs, to the transmission HARQ processing unit 203, a designated data amount of data designated according to an instruction from the MAC control unit 212. Further, the transmitted data storage unit 202 outputs, to the MAC control unit 212, information representing a data amount of the accumulated data.

The transmission HARQ processing unit 203 encodes the input data and punctures the encoded data. Then, the transmission HARQ processing unit 203 outputs the punctured data to the data transmission processing unit 204, and stores the encoded data. In a case of having been instructed by the MAC control unit 212 to retransmit the data, the transmission HARQ processing unit 203 punctures the stored (buffered) encoded data in a manner different from the previous puncture, and outputs the punctured data to the transmission processing unit 204. In a case of having been instructed by the MAC control unit 212 to erase data, the transmission HARQ processing unit 203 erases data corresponding to the designated cell.

The transmission processing unit 204 modulates and encodes the data inputted from the transmission HARQ processing unit 203. The transmission processing unit 204 performs DFT (discrete Fourier transform)-IFFT (inverse fast Fourier transform) on the modulated and encoded data, inserts a CP (cyclic prefix) into the Fourier transformed data, mapping the CP-inserted data onto a physical uplink shared channel (PUSCH) of each component carrier (cell) of the uplink, and outputs the data to the radio unit 205.

Further, in a case of having been instructed by the PHY control unit 211 to respond to the received data, the transmission processing unit 204 generates an ACK or NACK signal, maps the generated signal onto a physical uplink control channel (PUCCH), and outputs it to the radio unit 205. In a case of having been instructed by the PHY control unit 211 to transmit a random access preamble, the transmission processing unit 204 generates a random access preamble, maps the generated signal onto a physical random access channel PRACH, and outputs it to the radio unit 205.

The radio unit 205 up-converts the data inputted from the transmission processing unit 204 into a radio frequency of transmission position information (transmission cell information) designated by the PHY control unit 211, adjusts transmit power, and transmits the data through a transmit antenna. Further, the radio unit 205 down-converts a radio signal received through a receive antenna, and outputs it to the reception processing unit 206. The radio unit 206 configures, as an uplink transmission timing, transmission timing information received from the PHY control unit 211.

The reception processing unit 206 performs processes such as FFT (fast Fourier transform), decoding, and demodulation on the signal inputted from the radio unit 205. The reception processing unit 206 demodulates a physical downlink control channel PDCCH or an enhanced physical downlink control channel EPDCCH and, in a case of having detected downlink allocation information of the terminal apparatus 1, demodulates a physical downlink shared channel PDSCH on the basis of the downlink allocation information, and outputs the acquired downlink allocation information to the MAC control unit 212.

The reception processing unit 206 outputs data representing the demodulated physical downlink shared channel PDSCH to the reception HARQ processing unit 207. The reception processing unit 206 demodulates the physical downlink control channel PDCCH or the enhanced physical downlink control channel EPDCCH and, in a case of having detected uplink transmission permission information (uplink grant) and an uplink transmission data response information (ACK/NACK), outputs the acquired response information to the MAC control unit 212. It should be noted that the uplink transmission permission information includes a scheme for modulating and encoding data, data size information, HARQ information, transmission position information, and the like.

The reception HARQ processing unit 207 demodulates the input data from the reception processing unit 206 and, in a case of having succeeded in the demodulation, outputs the data to the MAC information extracting unit 208. In a case of having failed in demodulating the input data, the reception HARQ processing unit 207 stores the data that it has failed in demodulating. In a case of having received retransmitted data, the reception HARQ processing unit 207 combines the stored data and the retransmitted data and demodulates the combined data. Further, the reception HARQ processing unit 207 notifies the MAC control unit 212 whether it has succeeded or failed in demodulating the input data.

The MAC information extracting unit 208 extracts control data of the MAC layer (medium access control layer) from the data inputted from the reception HARQ processing unit 207, and outputs the extracted MAC control information to the MAC control unit 212. The MAC information extracting unit 208 outputs the remaining data to the data processing unit 209. The data processing unit 209 has the functions of the PDCP layer and the RLC layer. The data processing unit 209 makes the data return to its original form by performing processes such as a function of extending (restoring) the compressed IP headers, a function of deciphering the ciphered data, and segmentation and concatenation of the data. The data processing unit 209 divides the data into an RRC message and user data, and outputs the RRC message to the RRC control unit 213 and the user data to the higher layer.

The measurement unit 210 measures the received power (RSRP) and reception quality (RSRQ) of the serving cell and the neighboring cells using downlink reference signals and synchronization signals subjected to FFT in the reception processing unit 206, and outputs measurement results to the RRC control unit 213.

The PHY control unit 211 controls the transmission processing unit 204, the radio unit 205, and the reception processing unit 206 according to instructions from the MAC control unit 212. The PHY control unit 211 notifies the transmission processing unit 204 of the demodulating and encoding scheme and the transmission position from the demodulating and encoding scheme, the transmit power information, and the transmission position information (transmission cell information) notified from the MAC control unit 212, and notifies the radio unit 205 of frequency information and transmit power information of the transmission cell.

The MAC control unit 212 has the function of the MAC layer. The MAC control unit 212 controls the MAC layer on the basis of information acquired from the RRC control unit 213 and the lower layer. The MAC control unit 212 determines destinations of data transmission and an order of priority of data transmission on the basis of the data transmission control configurations designated by the RRC control unit 213, the data amount information acquired from the transmitted data storage unit 212, and the uplink transmission permission information acquired from the reception processing unit 206, and notifies the transmitted data storage unit 202 of information concerning the data to be transmitted. Further, the MAC control unit 212 notifies the transmission HARQ processing unit 203 of HARQ information and outputs the demodulating and encoding scheme to the PHY control unit 211.

Further, the MAC control unit 212 acquires response information to the uplink transmission data from the reception processing unit 206 and, in a case where the response information indicates NACK (negative response), instructs the transmission HARQ processing unit 203 and the PHY control unit 211 to perform retransmissions. In a case of having acquired, from the reception HARQ processing unit 207, information as to whether it has succeeded or failed in demodulating the data, the MAC control unit 212 instructs the PHY control unit 211 to transmit an ACK or NACK signal.

The RRC control unit 213 configures various configurations for communication with a base station apparatus 3, such as the process of getting connected to or disconnected from the base station apparatus 3, the acquisition of RAN assistant information for offloading, the data transmission control configurations of the control data and the user data. Further, the RRC control unit 213 exchanges information with the NAC control unit 214 along with the various configurations, and controls the lower layer along with the various configurations.

The RRC control unit 213 creates an RRC message, and outputs the created RRC message to the data generating unit 201. Further, the RRC control unit 213 analyzes the RRC message inputted from the data processing unit 209.

Further, the RRC control unit 213 outputs information necessary for the MAC layer to the MAC control unit 212, and outputs information necessary for the physical layer to the PHY control unit 211.

Further, the RRC control unit 213 creates an RRC message containing non-access stratum protocol data (NAS message) that is inputted from the NAS control unit 214, and outputs the created RRC message to the gate generating unit 201. In a case where the RRC message inputted from the data processing unit 209 contains non-access stratum protocol data, the RRC control unit 213 outputs the data to the NAS control unit 214.

Further, the RRC control unit 213 outputs, to the NAS control unit 214, the RAN assistant information (or information obtained by manipulating the RAN assistant information) and the measured values measured by the measurement unit 210 (or information obtained by manipulating the measured values).

The NAS control unit 214 outputs, to the RRC control unit 213, non-access stratum protocol data to be transmitted to the MME. Further, non-access stratum protocol data received from the MME is inputted to the NAS control unit 214 through the RRC control unit 213.

Further, the NAS control unit 214 notifies the higher layer of the RAN assistant information and measured values inputted from the RRC control unit 213 (and manipulated if needed).

It should be noted that the transmission processing unit 204, the radio unit 205, the reception processing unit 206, and the PHY control unit 211 perform the operation of the physical layer, that the transmitted data storage unit 202, the transmission HARQ processing unit 203, the reception HARQ processing unit 207, the MAC information extracting unit 208, and the MAC control unit 212 perform the operation of the MAC layer, that the data generating unit 201 and the data processing unit 209 perform the operation of the RLC layer and the PDCP layer, and that the RRC control unit 213 performs the operation of the RRC layer.

Figure 3:
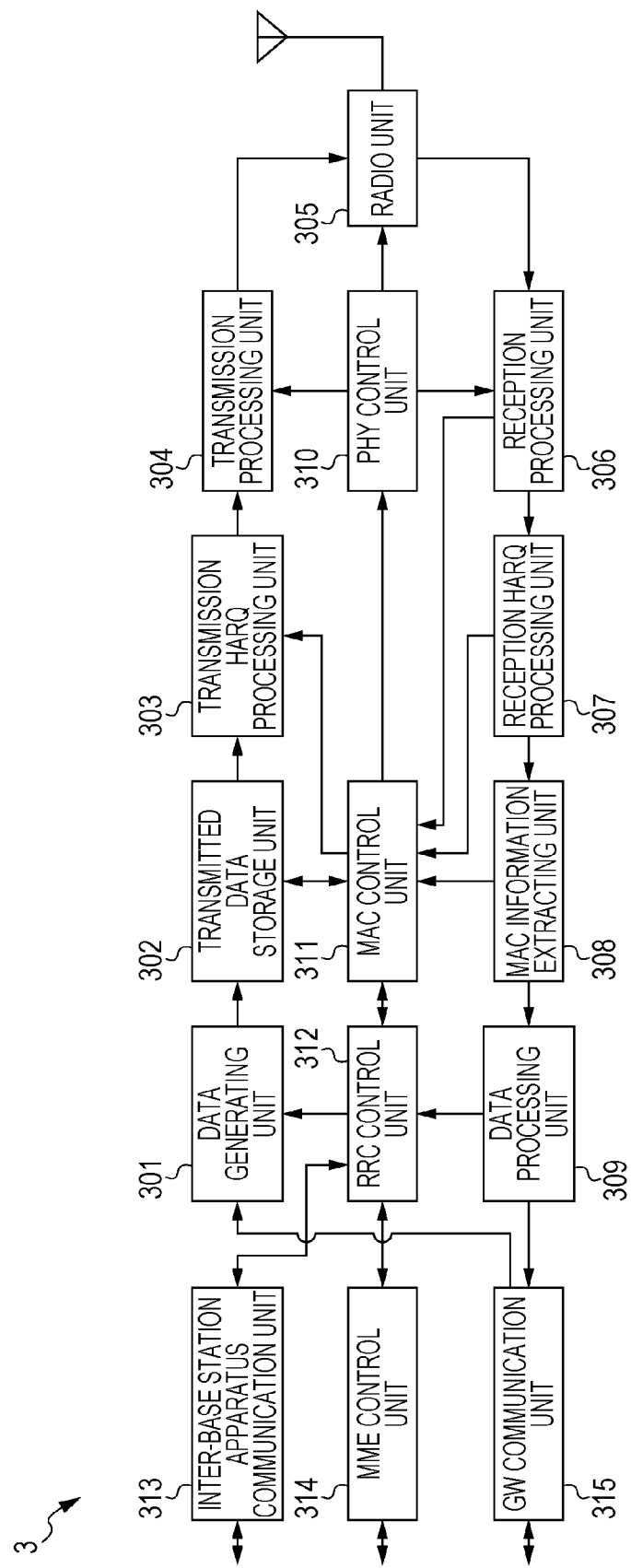
FIG. 3 is a block diagram schematically showing an example configuration of a terminal apparatus according to an embodiment of the present invention.

FIG. 3 is a diagram showing an example of a configuration of a base station apparatus according to the embodiment of the present invention. The base station apparatus 3 includes a data generating unit 301, a transmitted data storage unit 302, a transmission HARQ processing unit 303, a transmission processing unit 304, a radio unit 305, a reception processing unit 306, a reception HARQ processing unit 307, an MAC information extracting unit 308, a data processing unit 309, a PHY control unit 310, an MAC control unit 311, an RRC control unit 312, an inter-base station apparatus communication unit 313, an MME communication unit 314, and a GW communication unit 315.

The data generating unit 301 receives user data from the GW communication unit 315 and control data from the RRC control unit 312. The data generating unit 301 has the functions of the PDCP layer and the RLC layer. The data generating unit 301 adjusts data size by performing processes such as header compression of the IP packets of the user data, ciphering of the data, and segmentation and concatenation of the data. The data generating unit 301 outputs the processed data and logical channel information of the data to the transmitted data storage unit 302.

The transmitted data storage unit 302 accumulates, for each user, the data inputted from the data generating unit 301 and outputs, to the transmission HARQ processing unit 303, a designated data amount of data designated according to an instruction from the MAC control unit 311. Further, the transmitted data storage unit 302 outputs, to the MAC control unit 311, information representing a data amount of the accumulated data.

The transmission HARQ processing unit 303 encodes the input data and punctures the encoded data. Then, the transmission HARQ processing unit 303 outputs the punctured data to the data transmission processing unit 304, and stores the encoded data. In a case of having been instructed by the MAC control unit 311 to retransmit the data, the transmission HARQ processing unit 303 punctures the stored encoded data in a manner different from the previous puncture, and outputs the punctured data to the transmission processing unit 304.

The transmission processing unit 304 modulates and encodes the data inputted from the transmission HARQ processing unit 303. The transmission processing unit 304 generates an OFDM signal by mapping the modulated and encoded data onto a signal and channels for each cell, such as a physical downlink control channel PDCCH, a downlink synchronization signal, a physical broadcast channel PBCH, and a physical downlink shared channel PDSCH and subjecting the mapped data to OFDM signal processing such as series/parallel conversion, IFFT (inverse fast Fourier transform), and CP insertion.

Then, the transmission processing unit 304 outputs the generated OFDM signal to the radio unit 305. Further, in a case of having been instructed by the MAC control unit 311 to respond to the received data, the transmission processing unit 304 generates an ACK or NACK signal, maps the generated signal onto the physical downlink control channel PDCCH, and outputs it to the radio unit 305.

The radio unit 305 up-converts the detain inputted from the transmission processing unit 304 into a radio frequency, adjusts transmit power, and the transmits the data through a transmit antenna. Further, the radio unit 305 down-converts a radio signal received through a receive antenna, and outputs it to the reception processing unit 306. The reception processing unit 306 performs processes such as FFT (fast Fourier transform), decoding, and demodulation on the signal inputted from the radio unit 305.

From among the demodulated data, the reception processing unit 306 outputs data on a physical uplink shared channel PUSCH to the reception HARQ processing unit 307. Further, from among the demodulated data, the reception processing unit 306 outputs response information (ACK/NACK) to downlink transmission data of the control data acquired from a physical uplink control channel PUCCH, downlink radio quality information (CQI), and uplink transmission request information (scheduling request) to the MAC control unit 311.

In a case of having detected a random access preamble, the reception processing unit 306 calculates a transmission timing from the detected random access preamble, and outputs the number of the detected random access preamble and the calculated transmission timing to the MAC control unit 311. The reception processing unit 306 calculates a transmission timing from an uplink reference signal, and outputs the calculated transmission timing to the MAC control unit 311.

The reception HARQ processing unit 307 demodulates the input data from the reception processing unit 306 and, in a case of having succeeded in the demodulation, outputs the data to the MAC information extracting unit 308. In a case of having failed in demodulating the input data, the reception HARQ processing unit 307 stores the data that it has failed in demodulating. In a case of having received retransmitted data, the reception HARQ processing unit 307 combines the stored data and the retransmitted data and demodulates the combined data. Further, the reception HARQ processing unit 307 notifies the MAC control unit 311 whether it has succeeded or failed in demodulating the input data. In a case of having been instructed by the MAC control unit 311 to erase data, the reception HARQ processing unit 307 erases data corresponding to the designated cell.

The MAC information extracting unit 308 extracts control data of the MAC layer from the data inputted from the reception HARQ processing unit 307, and outputs the extracted MAC control information to the MAC control unit 311. The MAC information extracting unit 308 outputs the remaining data to the data processing unit 309. The data processing unit 309 has the functions of the PDCP layer and the RLC layer. The data processing unit 309 makes the data return to its original form by performing processes such as a function of extending (restoring) the compressed IP headers, a function of deciphering the ciphered data, and segmentation and concatenation of the data. The data processing unit 309 divides the data into an RRC message and user data, and outputs the RRC message to the RRC control unit 312 and the user data to the MME communication unit 314 or the GW communication unit 315.

The MAC control unit 311 has the function of the MAC layer. The MAC control unit 311 controls the MAC layer on the basis of information acquired from the RRC control unit 312 and the lower layer. Further, the MAC control unit 311 performs downlink and uplink scheduling processes.

Further, the MAC control unit 311 acquires response information to the uplink transmission data from the reception processing unit 306 and, in a case where the response information indicates NACK (negative response), instructs the transmission HARQ processing unit 303 and the transmission processing unit 304 to perform retransmissions. In a case of having acquired, from the reception HARQ processing unit 307, information as to whether it has succeeded or failed in demodulating the data, the MAC control unit 311 instructs the transmission processing unit 304 to transmit an ACK or NACK signal.

The RRC control unit 312 configures various configurations for communication with a mobile station apparatus 1, such as the process of getting connected to or disconnected from the mobile station apparatus 3, the notification of RAN assistant information for offloading, the data transmission control configurations of the control data and the user data. Further, the RRC control unit 312 exchanges information with the higher layer through the MME communication unit 314 and the like along with the various configurations, and controls the lower layer along with the various configurations.

The RRC control unit 312 creates various RRC messages, and outputs the created RRC messages to the data generating unit 301. The RRC control unit 312 analyzes the RRC message inputted from the data processing unit 309.

Further, the RRC control unit 312 outputs information necessary for the MAC layer to the MAC control unit 311, and outputs information necessary for the physical layer to the PHY control unit 310. Further, in performing handover, the RRC control unit 312 notifies the inter-base station apparatus communication unit 313 and the MME communication unit 314 of necessary information.

Further, the RRC control unit 312 creates an RRC message containing an NAS message that is inputted from the MME communication unit 314, and outputs the created RRC message to the gate generating unit 301. In a case where the RRC message inputted from the data processing unit 309 contains non-access stratum protocol data, the RRC control unit 312 outputs the data to the MME communication unit 314.

The inter-base station apparatus communication unit 313 communicates with another base station apparatus 3. The inter-base station apparatus communication unit 313 transmits, to another base station apparatus 3, an inter-base station apparatus control message inputted from the RRC control unit 312. Further, the inter-base station apparatus communication unit 313 receives an inter-base station apparatus control message from another base station apparatus 3, and outputs the received control message to the RRC control unit 312. Examples of inter-base station apparatus control messages include a control message concerning handover.

The MME communication unit 314 communicates with the MME. The MME communication unit 314 transmits, to the MME, a control message between the base station apparatus and the MME inputted from the RRC control unit 312 and an NAS message from a terminal apparatus 1. Further, the MME communication unit 314 receives a control massage between the base station apparatus and the MME from the MME and an NAS message to a terminal apparatus 1, and outputs the received control message to the RRC control unit 312.

The GW communication unit 315 communicates with the GW. The GW communication unit 312 receives user data of a terminal apparatus 1 from the GW, and outputs the received data to the data generating unit 301. Further, the GW communication unit 315 receives user data of a terminal apparatus 1 from the data processing unit 309, and transmits the user data to the GW.

It should be noted that the transmission processing unit 304, the radio unit 305, and the reception processing unit 306 perform the operation of the PHY layer, that the transmitted data storage unit 302, the transmission HARQ processing unit 303, the reception HARQ processing unit 307, the MAC information extracting unit 308, and the MAC control unit 311 perform the operation of the MAC layer, that the data generating unit 301 and the data processing unit 309 perform the operation of the RLC layer and the PDCP layer, and that the RRC control unit 312 performs the operation of the RRC layer.

The following describes an example of a process in which a terminal apparatus 1 according to the present embodiment selects an interface. FIG. 4 is a chart showing a procedure in which, in order to select an interface, the terminal apparatus 1 acquires a policy from an ANDSF server and acquires radio access network assistant information from a base station apparatus 3.

First, the policy receiving unit 101 of the terminal apparatus 1 receives a policy (ANDSF MO) from a server (i.e., the ANDSF server) that distributes policies of interface selection, and the policy holding unit 102 holds the policy (step S41). This policy contains parameters (such as rules and thresholds) for each separate access class. For example, the policy may contain the respective parameters for all access classes (or for each separate group of access classes). Alternatively, the policy may contain only the parameters for ACs 0 to 9 and 11 to 15 without including the parameters for a particular access class (AC 10).

The E-UTRA communication unit 2 of the terminal apparatus 1 acquires RAN assistant information from the base station apparatus 3 (step S42). The RAN assistant information may be acquired from broadcast information, or may be notified as a message addressed to (the E-UTRA communication unit 2 of) the terminal apparatus 1. Alternatively, the E-UTRA communication unit 2 of the terminal apparatus 1 may replace RAN assistant information acquired from broadcast information with RAN assistant information contained in a message addressed to the terminal apparatus 1. The RAN assistant information contains parameters (such as thresholds) for each separate access class (or for each separate group of access classes). Further, the RAN assistant information may contain parameters common to the access classes. For example, FIG. 5 shows an example of an RRC message in a case where load information and thresholds (RAN threshold, WLAN threshold) for each separate group are contained as information common to the access classes.

Further, the RAN assistant information that is broadcasted (notified) from the base station apparatus 3 may be a combination of bitmap information indicating to which of the access classes it is applied and parameters (such as thresholds).

The E-UTRA communication unit 2 of the terminal apparatus 1 outputs the acquired RAN assistant information to the higher layer (i.e., the interface selecting unit 103) together with information such as a measured value of received power (step S45). The RAN assistant information that is outputted to the interface selecting unit 103 may be only information on an access class selected on the basis of the access class retained, or may be information on all access classes.

Further, if necessary, the WLAN communication unit 105 of the terminal apparatus 1 may acquire AP load information that is broadcasted from a wireless LAN access point (AP) (step S43), and may output the AP load information to the interface selecting unit 103 together with information such as a measured value of received power (step S44).

The interface selecting unit 103 makes an evaluation on the basis of the policy held by the policy holding unit 102 and the RAN assistant information, and selects an interface (step S46). For example, the policy holding unit 102 is holding the ISRP rule that "in a case where the received power of the serving cell of E-UTRA falls short of a threshold A and the load of the serving cell exceeds a threshold B, communication addressed to a particular IP address is connected to a particular AP using the WLAN communication unit", and the thresholds A and B are notified as the RAN assistant information. Note here that the values of the thresholds A and B are configured for each separate access class (or for each separate group of access classes). The information on all access classes may be inputted as the RAN assistant information from the E-UTRA communication unit 2 to the interface selecting unit 103, and the thresholds that the interface selecting unit 103 uses may be selected on the basis of the access class retained. Alternatively, only the information on the access class retained may be inputted as the RAN assistant information from the E-UTRA communication unit 2 to the interface selecting unit 103. At this time, in a case where the terminal apparatus 1 retains any of ACs 11 to 15 and is not connected to a network in which the access class retained becomes effective, the terminal apparatus 1 may select parameters on the assumption that it retains any of ACs 0 to 9.

Further, as noted previously, the parameters for AC 10 are not included in the parameters for each separate access class contained in the policy that is received from the server, as AC 10 is an access class that is configured in making an emergency call. Further, the policy contains the parameters common to all access classes, and in a case where the policy contains the parameters for ACs 11 to 15, terminal apparatuses retaining ACs 11 to 15 may replace the common parameters with the parameters for ACs 11 to 15, respectively.

Alternatively, in a case where the policy-distributing server recognizes the access class retained by a terminal apparatus 1, the terminal apparatus 1 may be individually notified of a policy based on the access class. The access class may be notified when the terminal apparatus 1 is connected to the policy-distributing server.

This achieves a wireless communication system in which terminal apparatuses 1 use policies and RAN assistant information according to the access classes retained by the terminal apparatuses 1, whereby, for example, terminal apparatuses 1 of low priority (of ACs 0 to 9) are preferentially offloaded to another wireless communication system (such as a WLAN) and more radio resources are allocated to communications that are performed by terminal apparatuses 1 of high priority. Further, timings of transfer to another communication system may be staggered by changing threshold values for each separate access class.

Second Embodiment

The following describes a second embodiment of the present invention. The first embodiment has shown an example of a case where the interface selecting unit 103 can recognize the access class retained by the terminal apparatus. The present embodiment shows an example of a case where the interface selecting unit 103 can recognize the access class retained by the terminal apparatus.

A terminal apparatus 1, the E-UTRA communication unit 2 of the terminal apparatus 1, and a base station apparatus 3 as used in the description of the present embodiment are the same as those used in the description of the first embodiment, and as such, are not repeatedly described in detail.

An example of a method in which a terminal apparatus 1 according to the present embodiment selects an interface is described. FIG. 6 is a chart showing a procedure in which, in order to select an interface, the terminal apparatus 1 according to the present embodiment acquires a policy from an ANDSF server and acquires radio access network assistant information from a base station apparatus 3.

First, the policy receiving unit 101 of the terminal apparatus 1 receives a policy (ANDSF MO) from a server (i.e., the ANDSF server) that distributes policies of interface selection, and the policy holding unit 102 holds the policy (step S61). This policy contains parameters (such as rules and thresholds) common to all access classes.

The E-UTRA communication unit 2 of the terminal apparatus 1 acquires RAN assistant information from the base station apparatus 3 (step S62). The RAN assistant information may be acquired from broadcast information, or may be notified as a message addressed to (the E-UTRA communication unit 2 of) the terminal apparatus 1. Alternatively, RAN assistant information acquired from broadcast information may be replaced with RAN assistant information contained in a message addressed to the terminal apparatus 1. The RAN assistant information contains parameters (such as thresholds) for each separate access class (or for each separate group of access classes). Further, the RAN assistant information may contain parameters common to the access classes.

The E-UTRA communication unit 2 of the terminal apparatus 1 selects (extracts), from the acquired RAN assistant information, the parameters for the access class retained by the terminal apparatus 1 (step S65). At this time, in a case where the terminal apparatus 1 retains any of ACs 11 to 15 and is not connected to a network in which the access class retained becomes effective, the terminal apparatus 1 may select parameters on the assumption that it retains any of ACs 0 to 9.

For example, step S65 may be executed by the RRC control unit 213. The RRC control unit 213 may have a variable for holding RAN assistant information. On the basis of the access class retained by the terminal apparatus and the effectiveness of the access class retained, the RRC control unit 213 may select, from among RAN assistant information contained in RRC messages broadcasted from the base station apparatus, RAN assistant information that becomes effective in the terminal apparatus. The RRC control unit 213 may store the RAN assistant information in the variable. The RRC control unit 213 may transfer the variable to the higher layer.

Alternatively, for example, step S65 may be executed by the NAS control unit 214. The NAS control unit 214 may have a variable for holding RAN assistant information. On the basis of the access class retained by the terminal apparatus and the effectiveness of the access class retained, the NAS control unit 214 may select, from among RAN assistant information contained in RRC messages broadcasted from the base station apparatus, RAN assistant information that becomes effective in the terminal apparatus. The NAS control unit 214 may store the RAN assistant information in the variable. The NAS control unit 214 may transfer the variable to the higher layer.

The E-UTRA communication unit 2 of the terminal apparatus 1 outputs the RAN assistant information selected in step S65 to the higher layer (i.e., the interface selecting unit 103) together with information such as a measured value of received power (step S66).

Further, if necessary, the WLAN communication unit 105 of the terminal apparatus 1 may acquire AP load information that is broadcasted from a wireless LAN access point (AP) (step S63), and may output the AP load information to the interface selecting unit 103 together with information such as a measured value of received power (step S64).

The interface selecting unit 103 makes an evaluation on the basis of the policy held by the policy holding unit 102 and the RAN assistant information, and selects an interface (step S67). For example, the policy holding unit 102 is holding the ISRP rule that "in a case where the received power of the serving cell of E-UTRA falls short of a threshold A and the load of the serving cell exceeds a threshold B, communication addressed to a particular IP address is connected to a particular AP using the WLAN communication unit", and the thresholds A and B are notified as the RAN assistant information. Note here that although the values of the thresholds A and B are configured for each separate access class (or for each separate group of access classes), the interface selecting unit 103 does not need to recognize the access class retained by the terminal apparatus, as only information on the access class retained is inputted as RAN assistant information from the E-TRAN communication unit 2 to the interface selecting unit 103. However, when the terminal apparatus makes an emergency call, the interface selecting unit 103 may recognize the access class as AC 10 and preferentially select the preset interface.

Alternatively, in a case where the policy-distributing server knows the access class retained by a terminal apparatus 1, the terminal apparatus 1 may be individually notified of a policy based on the access class.

This allows terminal apparatuses 1 to use policies and RAN assistant information according to the access classes retained by the terminal apparatuses 1, whereby, for example, terminal apparatuses 1 of low priority (of ACs 0 to 9) are preferentially offloaded to a WLAN and more radio resources are allocated to communications that are performed by terminal apparatuses 1 of high priority. Further, timings of transfer to another communication system may be staggered by changing threshold values for each separate access class.

Furthermore, the configuration of parameters in the E-UTRA communication unit 2 for interface selection according to access classes makes it possible to select an interface without the need for the policy-distributing server and the interface selecting unit 103 to recognize the access class retained by the terminal apparatus 1.

The second embodiment has shown an example in which parameters (such as rules and thresholds) are selected according to access classes. However, this does not imply any limitation. Load information, a measured value of received power, or the like may be processed on the basis of the access class retained and be outputted to the interface selecting unit 103. For example, in a case where the terminal apparatus retains any of ACs 11 to 15, terminal apparatuses retaining ACs 0 to 9 can be preferentially offloaded to another system by multiplying load information broadcasted by the base station apparatus by a coefficient of less than 1 or multiplying a measured value of received power by a coefficient of 1 or greater.

The names of the parameters described in the above embodiments of the present invention are used for convenience of explanation, and differences between the names of parameters that are actually applied and the names of the parameters according to the present invention, if any, do not affect the spirit of invention claimed by the present invention.

Further, in the above embodiments, selection, as the type of terminal apparatus, of a policy based on an access class or RAN assistant information has been described. However, such a policy or RAN assistant information may be selected on the basis of another piece of information that groups terminal apparatuses. For example, such a policy or RAN assistant information may be selected, for example, according to whether the terminal apparatus is a terminal directed to small-sized-module communication (Machine-Type Communication: MTC) which requires no human operation or whether the terminal apparatus is a high-speed mobile terminal.

An embodiment of the present invention has been described in detail with reference to the drawings. However, a specific configuration is not limited to that described above, and design variations and the like can be made, provided such variations do not depart from the gist of the invention.

Further, a terminal apparatus 1 according to any of the embodiments described above can be applied to stationary or immovable electronic devices that are installed indoors or outdoors, as well as portable or movable mobile station apparatuses, such as audiovisual equipment, kitchen appliances, cleaning and washing machines, air-conditioning equipment, office devices, vending machines, domestic appliances, measuring instruments, and on-board units. A terminal apparatus 1 is also referred to as "user terminal", "mobile station apparatus", "communication terminal", "mobile machine", "terminal", "UE (user equipment)", and "MS (mobile station)". A base station apparatus 3 is also referred to as "wireless base station apparatus", "base station", "wireless base station", "fixed station", "NB (Node-B)", "eNB (evolved Node-B)", "BTS (base transceiver station)", and "BS (base station)".

For convenience of explanation, a terminal apparatus 1, the E-UTRA communication unit 2 of the terminal apparatus 1, and a base station apparatus 3 according any of the embodiments have been described with reference to functional block diagrams. However, the functions of the components of the terminal apparatus 1, the E-UTRA communication unit 2 of the terminal apparatus 1, and the base station apparatus 3 or the steps of a method or algorithm for achieving a part of these functions can be directly embodied by hardware, a software module that is executed by a processor, or a combination of these two. A function implemented by software can be held or communicated as one or more commands or codes on a computer-readable medium. The computer-readable storage medium encompasses both communication media including a medium that helps carry a computer program from one place to another and computer storage media.

Moreover, the base station apparatus 3 and the terminal apparatus 1 may be controlled by storing one or more commands or codes in a computer-readable storage medium, causing a computer system to read in the one or more commands or codes stored in the storage medium, and executing the one or more commands or codes. The term "computer system" as used herein encompasses hardware such as OSs and peripherals.

Operation described in any of the embodiments of the present invention may be achieved by a program. A program that runs on a terminal apparatus 1, the E-UTRA communication unit 2 of the terminal apparatus 1, or a base station apparatus 3 according to any of the embodiments of the present invention is a program that controls a CPU or the like (i.e., a program that causes a computer to function) so that the functions of the above-described embodiments of the present invention are achieved. Moreover, information that is handled by these devices is temporarily accumulated in RAM during processing thereof, stored in various types of ROM and/or HDD after that, and read out by the CPU as needed for modification and/or writing. Further, not only are the functions of the embodiments described above achieved by executing the program, but also the functions of the present invention may be achieved by executing processing in cooperation with an operating system or another application program on the basis of instructions from the program.

Further, the term "computer-readable storage medium" refers to storage devices such as portable media such as semiconductor media (such as RAM and nonvolatile memory cards), optical storage media (such as DVDs, MOs, CDs, and BDs), and magnetic storage media (such as magnetic tapes and flexible disks) and disk units built in computer systems. Furthermore, the term "computer-readable storage medium" also encompasses a medium in which the program is dynamically held for a short period of time, such as a communication wire in the case of transmission of the program via a network such as the Internet or a communication line such as a telephone line, and, in that case, a medium in which the program is held for a certain period of time, such as a volatile memory inside of a computer system serving as a server or a client.

Further, the program may be the one that serves to achieve a part of the functions described above. Furthermore, the program may be the one that can achieve the above-described functions in combination with a program already stored in a computer system.

The functional blocks or features of a terminal apparatus 1, the E-UTRA communication unit 2 of the terminal apparatus 1, and a base station apparatus 3 used in any of the above embodiments may be implemented or executed by a general-purpose processor designed to execute the functions described herein, a digital signal processor (DSP), an application-specific or general-use integrated circuit (ASIC), a field programmable gate array signal (FPGA), or other programmable logical devices, discrete gates, or transistor logic, discrete hardware components, or a combination of these. The general-purpose processor may be a microprocessor. Alternatively, the processor may be a conventional processor, controller, microcontroller, or state machine. The general-purpose processor or each of the circuits mentioned above may be constituted by a digital circuit or an analog circuit.

Alternatively, the processor may be implemented as a combination of computing devices. Examples include a combination of a DSP and a microprocessor, a plurality of microprocessors, one or more microprocessors connected to a DSP core, or a combination of such configurations. Further, in a case where a technology of integrated circuit construction alternative to LSI comes out due to the advancement of technology, it is possible to use integrated circuits based on such a technology.

The foregoing has described embodiments of the present invention with reference to particular specific examples. However, it is apparent that the spirit of the present invention and the scope of claims are not limited to these particular specific examples. That is, the description given herein is intended for illustrative purposes and does not impose any restrictions on the present invention.

INDUSTRIAL APPLICABILITY

An aspect of the present invention can be applied to a wireless communication system a terminal apparatus, a wireless communication method, an integrated circuit, and the like each of which uses radio access network assistant information according to the type of terminal apparatus.

DESCRIPTION OF REFERENCE NUMERALS

1 Terminal apparatus
2 E-UTRA communication unit
3 Base station apparatus
101 Policy receiving unit
102 Policy holding unit
103 Interface selecting unit
104 User policy processing unit
105 WLAN communication unit
201, 301 Data generating unit
202, 302 Transmitted data storage unit
203, 303 Transmission HARQ processing unit
204, 304 Transmission processing unit
205, 305 Radio unit
206, 306 Reception processing unit
207, 307 Reception HARQ processing unit
208, 308 MAC information extracting unit
209, 309 Data processing unit
210 Measurement unit
211, 310 PHY control unit
212, 311 MAC control unit
213, 312 RRC control unit
214 NAS control unit
313 Inter-base station apparatus communication unit
314 MME communication unit
315 GW communication unit

The invention claimed is:

1. A terminal device comprising:
a processor configured and/or programmed to:
measure Reference Signal Received Power (RSRP) of a serving cell of an Evolved Universal Terrestrial Radio Access Network (E-UTRAN);
receive broadcasted system information from the E-UTRAN, the broadcasted system information including a plurality of first parameters, each of the plurality of first parameters corresponding to a group and containing information relevant for traffic steering between the E-UTRAN and a wireless LAN (WLAN);
select a second parameter from the plurality of first parameters based on a group which the terminal device belongs to; and
provide first threshold information and a measurement result of the RSRP to an upper layer in the terminal device, the first threshold information being included in the second parameters; wherein
a condition used in traffic steering from the E-UTRAN to the WLAN requires that the first threshold information is larger than the measurement result of the RSRP; and
in a case that a message including a third parameter, specifically for the terminal apparatus, is received from the E-UTRAN, the processor is configured and/or programmed to configure the third parameter as the second parameter.

2. The terminal device according to claim 1, wherein the processor is configured and/or programmed to:
measure Reference Signal Received Quality (RSRQ) of the serving cell of the E-UTRAN;
provide second threshold information and the measurement result of the RSRQ to the upper layer in the terminal device, the second threshold information being included in the second parameters; wherein
a condition used in traffic steering from the E-UTRAN to the WLAN requires that the second threshold information is larger than the measurement result of the RSRQ.

3. A communication method of a terminal device, the communication method comprising:
measuring Reference Signal Received Power (RSRP) of a serving cell of an Evolved Universal Terrestrial Radio Access Network (E-UTRAN);
receiving broadcasted system information from the E-UTRAN, the broadcasted system information including a plurality of first parameters, each of the plurality of first parameters corresponding to a group and containing information relevant for traffic steering between the E-UTRAN and a wireless LAN (WLAN);
selecting a second parameter from the plurality of first parameters based on, a group which the terminal device belongs to; and
providing first threshold information and a measurement result of the RSRP to an upper layer in the terminal device, the first threshold information being included in the second parameters; wherein
a condition used in traffic steering from the E-UTRAN to the WLAN requires that the first threshold information is larger than the measurement result of the RSRP; and
in a case that a message including a third parameter, specifically for the terminal apparatus, is received from the E-UTRAN, the processor is configured and/or programmed to configure the third parameter as the second parameter.

4. The communication method of the terminal device according to claim 3, the communication method further comprising:
measuring Reference Signal Received Quality (RSRQ) of the serving cell of the E-UTRAN; and
providing second threshold information and the measurement result of the RSRQ to the upper layer in the terminal device, the second threshold information being included in the second parameters; wherein
a condition used in traffic steering from the E-UTRAN to the WLAN requires that the second threshold information is larger than the measurement result of the RSRQ.

* * * * *